Patented Nov. 14, 1933

1,935,264

UNITED STATES PATENT OFFICE 1,935,264

ESTERS OF SULPHONATED AROMATIC CARBOXYLIC ACIDS AND PROCESS OF MAKING SAME

Friedrich Felix and Otto Albrecht, Basel, Switzerland, assignors to the firm of Society of Chemical Industry in Basle, Basel, Switzerland No Drawing. Application March 13, 1931, Serial No. 522,506, and in Switzerland March 29, 1930

21 Claims. (Cl. 260—103)

The present invention relates to the manufacture of new esters of sulphonated aromatic carboxylic acids. It comprises the process of making these new esters, the new esters themselves, and the material treated with the new esters.

According to this invention new esters valuable as auxiliaries in industry are made by the esterification or reaction of a sulphonic acid or a sulphonate of an aromatic dicarboxylic acid of the benzene and naphthalene series or a substitution product thereof, an anhydride or halide thereof, such as a sulphonic acid of phthalic acid, isophthalic acid, naphthalic acid or an anhydride of one of these, the sulphoterephthalic acid, a sulpho-4-chlorophthalic acid, a 4-sulphophthalic acid-trichloride or the like, with a compound which contains hydroxyl groups bound to carbon atoms and more than two carbon atoms, and in which no atom is bound to oxygen atoms with more than two valencies, or a derivative of such a compound.

The free sulphonic acid or its salts may be heated with the alcohol or alcohol-like compound for producing the esterification; in some cases hydrogen chloride gas, concentrated sulphuric acid or another agent tending to accelerate esterification may be present. The esterification is facilitated if, in the course of the reaction, the water produced is removed from the mixture in known manner, for example with the aid of a material which can form an azeotropic mixture with water. Instead of starting from a sulphonic acid chloride, the latter may be produced during the esterification, for example by use of phosphorus oxychloride or the like. The sulphonic acid which is to be esterified need not be pure but may be in the form of the sulphonation mass obtained, as described in Swiss application No. 75,442 of 1930, by heating the parent material with sulphuric anhydride under pressure and removing the greater part of the excess of sulphonating agent used. Compounds containing hydroxyl groups suitable for the esterification are mono- and poly-hydric saturated or unsaturated aliphatic alcohols with normal carbon chains or branched chains and containing hydroxyl groups linked to primary, secondary or tertiary carbon atoms, or derivatives of these, so far as they still contain a free hydroxyl group, for instance isopropyl alcohol, butyl alcohol, amyl alcohol, octyl alcohol, diethylene-glycol, diethylene-glycol-mono-ethylether, glycerin or the like. There also come into consideration natural or synthetic higher fatty alcohols or alcohols derived from waxes, for instance cetyl alcohol, stearyl alcohol, oleyl alcohol or mixtures thereof; also oxidation products of aliphatic hydrocarbons or alcohol-like compounds or mixtures of such compounds obtainable by catalytic hydrogenation; further, diacetone alcohol, hydrogenized final distillates of acetone or alcohols which are obtained by hydration of the unsaturated hydrocarbons formed by the cracking of acid resin or the residual pitch from the distillation of aliphatic raw materials. The alcohol to be esterified need not be either in pure or in anhydrous condition; preferably naturally occurring or artificially produced mixtures are used, for example fusel oil, fusel oil from sulphite spirit or the commercial mixture of higher fatty alcohols; also suitable are aliphatic-aromatic alcohols, such as benzyl alcohol; further, phenols, cresols, naphthols, i. e. products containing conjugated double bonds, or the like, as well as their hydrogenated or partially hydrogenated derivatives, such as cyclohexanol, methylhexaline and the like. Ammonia derivatives containing hydroxyl groups, such as triethanol-amine, may be used. The esters may also be made from the derivatives of the compounds in question containing hydroxyl groups, for instance from their oxides or halides. The latter are advantageously caused to react with the salts of the aromatic sulpho-dicarboxylic acids. Finally, the esters can be made by double decomposition, for instance by causing to react an ester of a lower alcohol with a higher alcohol.

The esters which are derived from the sulphonic acids of aromatic dicarboxylic acids of the benzene and naphthalene series or their substitution products contain, on the one hand, the residues of the aromatic sulpho-dicarboxylic acids used and, on the other hand, residues adhering to the carboxyl group of the general formula O—R, wherein R means the residues of the above mentioned compounds which contain hydroxyl groups bound to carbon atoms and more than two carbon atoms, and in which no atom is bound to oxygen atoms with more than two valencies, and which are free from heterocyclic rings. They constitute, in the form of their dried alkali salts, colorless to light-colored powders which easily dissolve in water, and which, when heated with saponifying agents, are split up into an aromatic sulpho-dicarboxylic acid and organic compounds containing hydroxyl groups. They have a pronounced tendency to assist wetting, cleansing and emulsification. They are therefore applicable in many ways in industry.

The following examples illustrate the invention, the parts being by weight:—

Example 1

In an autoclave phthalic acid-anhydride is converted into sulpho-phthalic acid anhydride by heating it for several hours with 3 molecular proportions of sulphuric acid anhydride to 140–150° C., as described in Swiss application No. 75,442 of 1930; with aid of a current of dry air or by prolonged heating to 190–200° C., the excess of sulphonating agent in the sulphonation mass is reduced to about 12 per cent.

On to 176 parts of the sulphonation mass thus obtained there are dropped gradually, while stirring, at 50–65° C. 130 parts of amyl alcohol of boiling point 128–132° C.; the temperature of the mass is raised in the course of about 30 minutes to 120–122° C. After cooling the mixture is diluted with ice, neutralized with a sodium hydroxide solution while cooling and evaporated to dryness, preferably under diminished pressure. There is thus obtained a somewhat grey powder, which dissolves freely in water; the aqueous solution foams strongly when shaken and has a pronounced wetting and emulsifying capacity. The product very probably constitutes a mixture of the two compounds

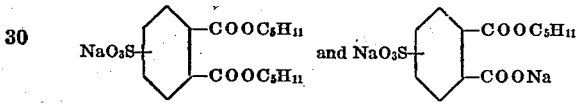

Instead of amyl alcohol the equivalent quantity of purified butyl alcohol or purified secondary octyl alcohol may be used. In both these cases it is advantageous to omit the heating to 120–122° C. and instead to stir the mixture for some time at 50–60° C.

The working up may follow the above directions.

Example 2

20 parts of β-sulphophthalic acid trichloride are heated with 58.5 parts of amyl alcohol so that the latter boils for 6 hours in a reflux apparatus. The excess of amyl alcohol is then distilled under diminished pressure, the residue is mixed with ice and neutralized with a sodium hydroxide solution and evaporated to dryness in a vacuum. There is obtained a freely soluble yellowish powder, which induces wetting, for instance in carbonizing acid. It very probably corresponds with the formula

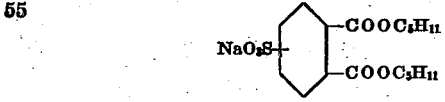

Example 3

In a vessel having a stirrer and a reflux condenser there is heated to boiling for a long time until reaction is complete, a mixture consisting of 20 parts of mono-sodiumphthalic acid-anhydride-β-sulphonate (which may be obtained for example by prolonged heating under diminished pressure of the acid sodium salt of the phthalic acid-β-sulphonic acid obtained in the usual manner), 28.4 parts of sulphite spirit fusel oil, 28.2 parts of benzene and 3 parts of concentrated hydrochloric acid. It is advantageous that the reflux condensate should be caused to pass in known manner through a water trap, so that the water produced by the reaction may be continuously separated. If necessary, loss of benzene by evaporation should be made good during the operation. After distilling the volatile matter, preferably in a vacuum, the product of esterification remains as a tough residue which is applicable directly as an auxiliary in the textile industry, for example as an aid in carbonizing.

Example 4

In the apparatus described in the preceding example 40.5 parts of fusel oil and 40.5 parts of toluene are heated together until the aqueous layer in the water trap no longer increases. There are then added 50 parts of the mono-sodium salt of sulphophthalic acid-anhydride and the boiling is continued for about 24 hours. After there has been added a mixture of 34.4 parts of fusel oil and a like amount of toluene, the heating is further continued to boiling until the esterification is complete. After separating the volatile matters the esterification mixture is obtained in the form of a solid, somewhat yellowish mass which has properties similar to those of the product described in Example 1.

In a similar manner esterification with methylhexaline can be produced, in which case, however, it is not necessary to dehydrate the alcoholic components as stated. There is thus obtained a bright yellow solid esterification product which has an excellent wetting effect in water.

Example 5

22.8 parts of sulpho-phthalic-acid-anhydride and 25.6 parts of the usual commercial mixture of cetyl- and stearyl-alcohols, are stirred together at 50–70° C. until the mixture is homogeneous. The temperature is then raised, while stirring, to 105° C. and the mass is allowed to cool. The product of esterification is treated with water, neutralized and evaporated to dryness, whereby it is obtained as a feebly grey powder which yields with water when heated a nearly clear, slightly opalescent solution, which foams strongly when shaken. The product is suitable for use as a washing agent, for example in washing raw wool.

Example 6

22.8 parts of sulphophthalic acid-anhydride and 21.6 parts of para-cresol are heated together in about 20 minutes to 115° C. while stirring. After cooling, the product is dissolved in water, neutralized and evaporated to dryness. There is obtained a grey-white powder, soluble in water to a clear solution which strongly lowers surface tension of solutions such as carbonizing acid.

Example 7

18.9 parts of 4-chlorophthalic acid-anhydride are converted into the sulphonic acid by heating them in a closed vessel with 33.2 parts of sulphuric acid anhydride during 10 hours to 205–210° C. The greater part of the sulphonating agent used in excess is then separated by prolonged heating to 190–200° C. 24.2 parts of the sulphonation mass containing 21.3 parts of sulphochlorophthalic acid-anhydride are heated with 28.7 parts of amyl alcohol on a boiling waterbath until practically complete dissolution has occurred. After having raised the temperature quickly to 120° C. the whole is allowed to cool. The product is a homogeneous liquid, which is dissolved by water to a clear solution which foams strongly when shaken. One may also neutralize the liquid and evaporate it to dryness, whereby an easily powdered, yellowish product is obtained which assists wetting in water or carbonizing acid.

In similar manner the sulphoterephthalic acid can be esterified with amyl alcohol by heating the sulphonation mass obtained from terephthalic acid and excess of sulphuric anhydride, as described above with amyl alcohol, after the sulphonation mass has been substantially freed from the excess of the sulphonating agent. The esterification product is a pale reddish-violet mass, easily pulverized, which is dissolved by water to a clear solution of high wetting capacity.

Example 8

There is heated, while stirring, a mixture of 9.7 parts of amyl alcohol and 13.9 parts of naphthalic acid-anhydride-3-sulphonic acid (the latter being obtainable from the free sulphonic acid by prolonged heating in a vacuum) for 15 minutes at 115–120° C. The esterification product is a grey paste which is applicable directly or after previous neutralization; it is dissolved by water to a clear somewhat brownish yellow solution of high wetting capacity.

For neutralization purposes there may be used in this example, and also in the preceding examples, an organic base instead of caustic soda solution or the like.

The following examples illustrate the application of the products obtainable according to the Examples 1 to 8:—

Example 9

Wool rags are impregnated with a sulphuric acid of 4° Bé., which contains per liter 0.5 gram of the ester from sulpho-4-chlorophthalic acid-anhydride and amyl alcohol. The wetting of the material occurs more rapidly than without the said addition; the seams or the cellulose-containing admixtures are thoroughly impregnated by the acid and fall apart in the carbonizing process. Other products behave in a similar manner, such as, for example, the esters from amyl alcohol or butyl alcohol and sulphophthalic acid.

Example 10

The ester from sulphophthalic acid and methylhexaline has in aqueous solution an unusually strong wetting capacity. Thus even a concentration of 1 gram per liter of this product determines the wetting of cotton in a very short time in a cold liquor. Woolen yarn, which is known to be wetted with difficulty, sinks very rapidly at the ordinary temperature in the liquor. Other esters, such as, for example, the amyl or butyl ester of the sulphophthalic acid have also a very good wetting-out effect.

Example 11

There is prepared a mercerizing solution of 30° Bé. which contains per liter 5 grams of the ester from sulphophthalic acid and fusel oil. In this solution raw cotton yarn or raw cotton fabrics may be mercerized directly without previous boiling or wetting.

Example 12

As is known, the dyeing throughout of fabrics or yarns which are closely woven or strongly twisted presents considerable difficulty. It has been found that, for example in the case of vat-dyestuffs, the through-dyeing can be essentially improved in the following manner:—

There is prepared a bath containing per liter of water 20 grams of the sodium salt of the ester from sulphophthalic acid and amyl alcohol, and 50 grams of Cibanone blue GCD double paste (cf. Supplement to the Colour Index, page 35). This suspension of dyestuff serves as an impregnating bath for the material to be dyed through, which is padded therein several times and then pressed. Afterwards the material thus impregnated is transferred to a fresh bath containing caustic soda solution and hydrosulphite, vatted in the usual manner, and then oxidized. A very good through-dyeing is thus obtained.

Example 13

There is made a solution containing per liter of water 2 grams of the ester from sulphophthalic acid and a mixture of cetyl and stearyl alcohol. In this solution greasy wool is washed at a temperature of 45° C. in the course of ½ hour. The bath may be used for several batches without further addition of the product and without marked diminution of its washing power. The washing effect is very advantageous and the wool is pure white. As compared with soap the product has the advantage that it is stable towards lime and neutral in reaction.

Example 14

The ester of sulphophthalic acid and amyl alcohol may be used with advantage for the production of emulsions. Solutions of 2 to 5 per cent. strength of the product may be used and in these oils, particularly also solvents, such as benzine and benzene, may be emulsified with ease. The emulsions of the solvents can be used with advantage for cleaning textiles which have been stained with oils, fats, pitch, or the like.

For removing mineral oil spots from cotton fabrics, there is made an emulsion of, for example, 50 grams of the above-named product, dissolved in 1000 cc. of water, with 1000 cc. of benzene. This emulsion is diluted with water to 10000 cc. and the fabric to be cleaned is handled therein during 5 minutes. After washing and drying the oil spots disappear without leaving a residue.

What we claim is:—

1. A manufacture of esters of aromatic sulphodicarboxylic acids of the benzene and naphthalene series by reaction of a member selected from the group of compounds consisting of the aromatic sulphodicarboxylic acids, their salts, anhydrides and halides, with compounds which contain at least one hydroxyl group bound to carbon atoms and more than two carbon atoms and in which no atom is bound to oxygen atoms with more than two valencies.

2. A manufacture of esters of aromatic sulphodicarboxylic acids of the benzene series by reaction of a member selected from the group of compounds, consisting of the aromatic sulphodicarboxylic acids of the benzene series, their salts, anhydrides and halides, with compounds which contain at least one hydroxyl group bound to carbon atoms and more than two carbon atoms and in which no atom is bound to oxygen atoms with more than two valencies.

3. A manufacture of esters of aromatic sulphodicarboxylic acids of the benzene series by reaction of a member selected from the group of compounds, consisting of the aromatic sulpho-ortho-dicarboxylic acids of the benzene series, their salts, anhydrides and halides, with compounds which contain at least one hydroxyl group bound to carbon atoms and more than two carbon atoms and in which no atom is bound to oxygen atoms with more than two valencies.

4. A manufacture of esters of aromatic sulphodicarboxylic acids of the benzene series by reaction of a member selected from the group of compounds, consisting of the sulphophthalic acid, its salts, anhydrides and halides, with compounds which contain at least one hydroxyl group bound to carbon atoms and more than two carbon atoms and in which no atom is bound to oxygen atoms with more than two valencies.

5. A manufacture of esters of aromatic sulphodicarboxylic acids of the benzene series by reaction of a member selected from the group of compounds, consisting of the sulphophthalic acid, its salts, anhydrides and halides, with organic compounds free from conjugated double bonds which contain at least one hydroxyl group bound to carbon atoms and more than two carbon atoms and in which no atom is bound to oxygen atoms with more than two valencies.

6. A manufacture of esters of aromatic sulphodicarboxylic acids of the benzene series by reaction of a member selected from the group of compounds consisting of the sulphophthalic acid, its salts, anhydrides and halides, with organic compounds free from conjugated double bonds which contain at least one hydroxyl group and more than four carbon atoms, and in which no atom is bound to oxygen atoms with more than two valencies.

7. A manufacture of esters of aromatic sulphodicarboxylic acids of the benzene series by reaction of a member selected from the group of compounds, consisting of the sulphophthalic acid, its salts, anhydrides and halides, with methylcyclohexanol.

8. A manufacture of esters of aromatic sulphodicarboxylic acids of the benzene series by reaction of a member selected from the group of compounds, consisting of the sulphophthalic acid, its salts, anhydrides and halides, with aliphatic compounds which contain one hydroxyl group bound to carbon atoms and more than two carbon atoms and in which no atom is bound to oxygen atoms with more than two valencies.

9. A manufacture of esters of aromatic sulphodicarboxylic acids of the benzene series by reaction of a member selected from the group of compounds, consisting of the sulphophthalic acid, its salts, anhydrides and halides, with amyl alcohol.

10. A manufacture of esters of aromatic sulphodicarboxylic acids of the benzene series by reaction of a member selected from the group of compounds, consisting of the sulphophthalic acid, its salts, anhydrides and halides, with cetyl alcohol.

11. The esters containing, on the one hand, residues of an aromatic sulphodicarboxylic acid of the benzene and naphthalene series and, on the other hand, residues adhering to the carboxyl group of the general formula O—R, wherein R means any organic residue which contains more than two carbon atoms and in which no atom is bound to oxygen atoms with more than two valencies, and which is free from heterocyclic rings, which products, in the form of their dried alkali salts, constitute colorless to light-colored powders which easily dissolve in water, and which, when heated with saponifying agents, are split up into an aromatic sulphodicarboxylic acid and organic compounds containing hydroxyl groups.

12. The esters containing, on the one hand, residues of a sulphodicarboxylic acid of the benzene series and, on the other hand, residues adhering to the carboxyl group of the general formula O—R, wherein R means any organic residue which contains more than two carbon atoms and in which no atom is bound to oxygen atoms with more than two valencies, and which is free from heterocyclic rings, which products, in the form of their dried alkali salts, constitute colorless to light-colored powders which easily dissolve in water, and which, when heated with saponifying agents, are split up into a sulphodicarboxylic acid of the benzene series and organic compounds containing hydroxyl groups.

13. The esters containing, on the one hand, residues of a sulpho-ortho-dicarboxylic acid of the benzene series and, on the other hand, residues adhering to the carboxyl group of the general formula O—R, wherein R means any organic residue which contains more than two carbon atoms and in which no atom is bound to oxygen atoms with more than two valencies, and which is free from heterocyclic rings, which products, in the form of their dried alkali salts, constitute colorless to light-colored powders which easily dissolve in water, and which, when heated with saponifying agents, are split up into a sulpho-ortho-dicarboxylic acid of the benzene series and organic compounds containing hydroxyl groups.

14. The esters containing, on the one hand, residues adhering to the carboxyl group of a sulphophthalic acid and, on the other hand, residues adhering to the carboxyl group of the general formula O—R, wherein R means any organic residue which contains more than two carbon atoms and in which no atom is bound to oxygen atoms with more than two valencies, and which is free from heterocyclic rings, which products, in the form of their dried alkali salts, constitute colorless to light-colored powders which easily dissolve in water, and which, when heated with saponifying agents, are split up into a sulphophthalic acid and organic compounds containing hydroxyl groups.

15. The esters containing, on the one hand, residues adhering to the carboxyl group of a sulphophthalic acid and, on the other hand, residues adhering to the carboxyl group of the general formula O—R, wherein R means an organic residue free from conjugated double bonds which contains more than two carbon atoms and in which no atom is bound to oxygen atoms with more than two valencies, and which is free from heterocyclic rings, which products, in the form of their dried alkali salts, constitute colorless to light-colored powders which easily dissolve in water, and which, when heated with saponifying agents, are split up into a sulphophthalic acid and organic compounds free from conjugated double bonds containing hydroxyl groups.

16. The esters containing, on the one hand, residues of a sulphophthalic acid and, on the other hand, residues adhering to the carboxyl group of the general formula O—R, wherein R means an organic residue free from conjugated double bonds which contain more than four carbon atoms, and in which no atom is bound to oxygen atoms with more than two valencies, and which is free from heterocyclic rings, which products, in the form of their dried alkali salts, constitute colorless to light-colored powders which easily dissolve in water, and which, when heated with saponifying agents, are split up into a sulphophthalic acid and organic compounds free from conjugated double bonds containing hydroxyl groups.

17. The esters containing, on the one hand, residues of a sulphophthalic acid and, on the other hand, residues of the general formula O—R, wherein R means a methyl-cyclohexyl residue, which products, in the form of their dried alkali salts, constitute colorless to light-colored powders which easily dissolve in water, and which, when heated with saponifying agents, are split up into a sulphophthalic acid and methyl-cyclohexanol.

18. The esters containing, on the one hand, residues adhering to the carboxyl group of a sulphophthalic acid and, on the other hand, residues adhering to the carboxyl group of the general formula O—R, wherein R means an aliphatic residue which contains more than two carbon atoms and in which no atom is bound to oxygen atoms with more than two valencies, and which is free from heterocyclic rings, which products, in the form of their dried alkali salts, constitute colorless to light-colored powders which easily dissolve in water, and which, when heated with saponifying agents, are split up into a sulphophthalic acid and aliphatic alcohols containing more than two carbon atoms.

19. The esters containing, on the one hand, residues adhering to the carboxyl group of a sulphophthalic acid and, on the other hand, residues adhering to the carboxyl group of the general formula O—R, wherein R means a saturated aliphatic residue which contains more than two carbon atoms and in which no atom is bound to oxygen atoms with more than two valencies, and which is free from heterocyclic rings, which products, in the form of their dried alkali salts, constitute colorless to light-colored powders which easily dissolve in water, and which, when heated with saponifying agents, are split up into a sulphophthalic acid and saturated aliphatic alcohols containing more than two carbon atoms.

20. The esters containing, on the one hand, residues of a sulphophthalic acid and, on the other hand, O—$C_5H_{11}$ residues, which products, in the form of their dried alkali salts, constitute colorless to light-colored powders which easily dissolve in water, and which, when heated with saponifying agents, are split up into a sulphophthalic acid and amyl alcohols.

21. The esters containing, on the one hand, residues of a sulphophthalic acid and on the other hand, O—$C_{16}H_{33}$ residues, which products, in the form of their dried alkali salts, constitute colorless to light-colored powders which easily dissolve in water, and which, when heated with saponifying agents, are split up into a sulphophthalic acid and cetyl alcohol.

FRIEDRICH FELIX.
OTTO ALBRECHT.